Dec. 11, 1928.
G. G. TUTTLE
PLATE VALVE
Filed Oct. 14, 1925  2 Sheets-Sheet 1
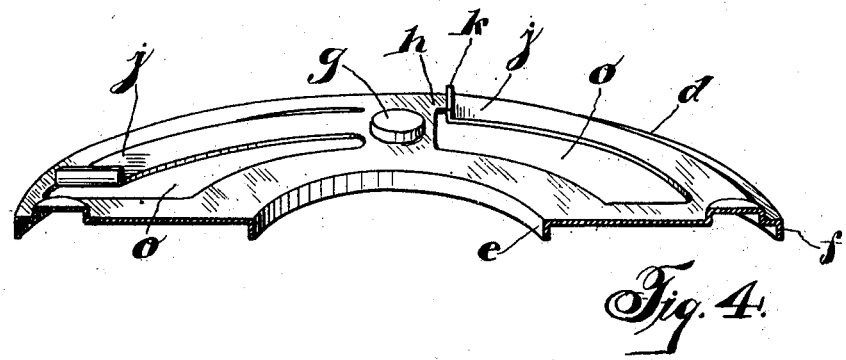
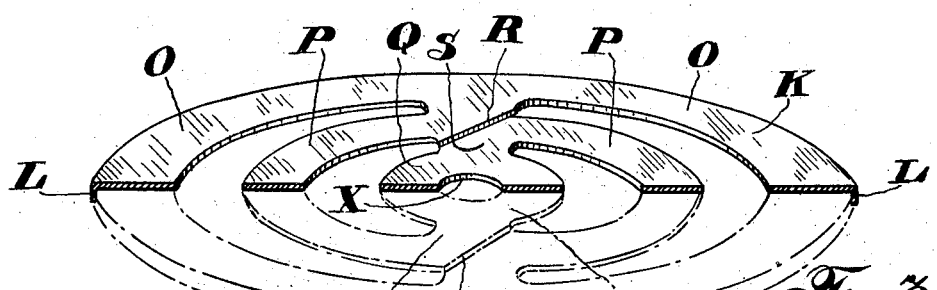
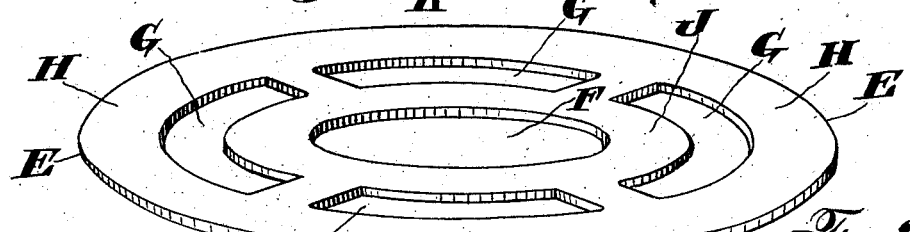
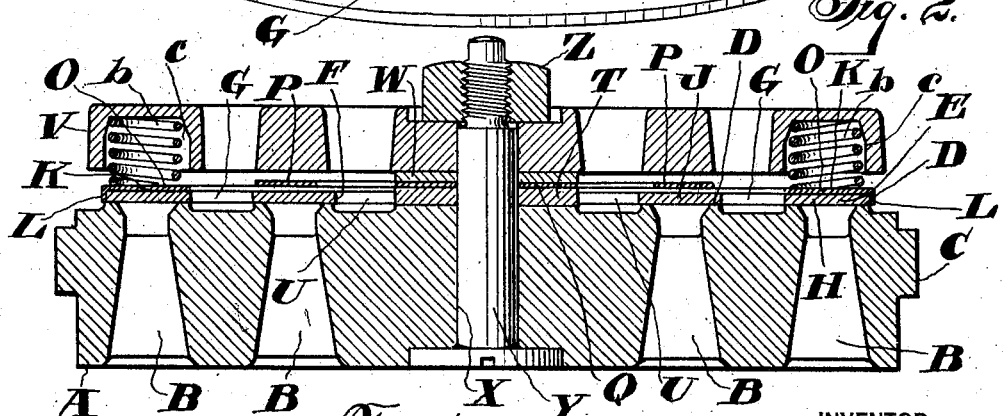
INVENTOR
Grover G. Tuttle.
BY
Herbert G. Ogden
HIS ATTORNEY

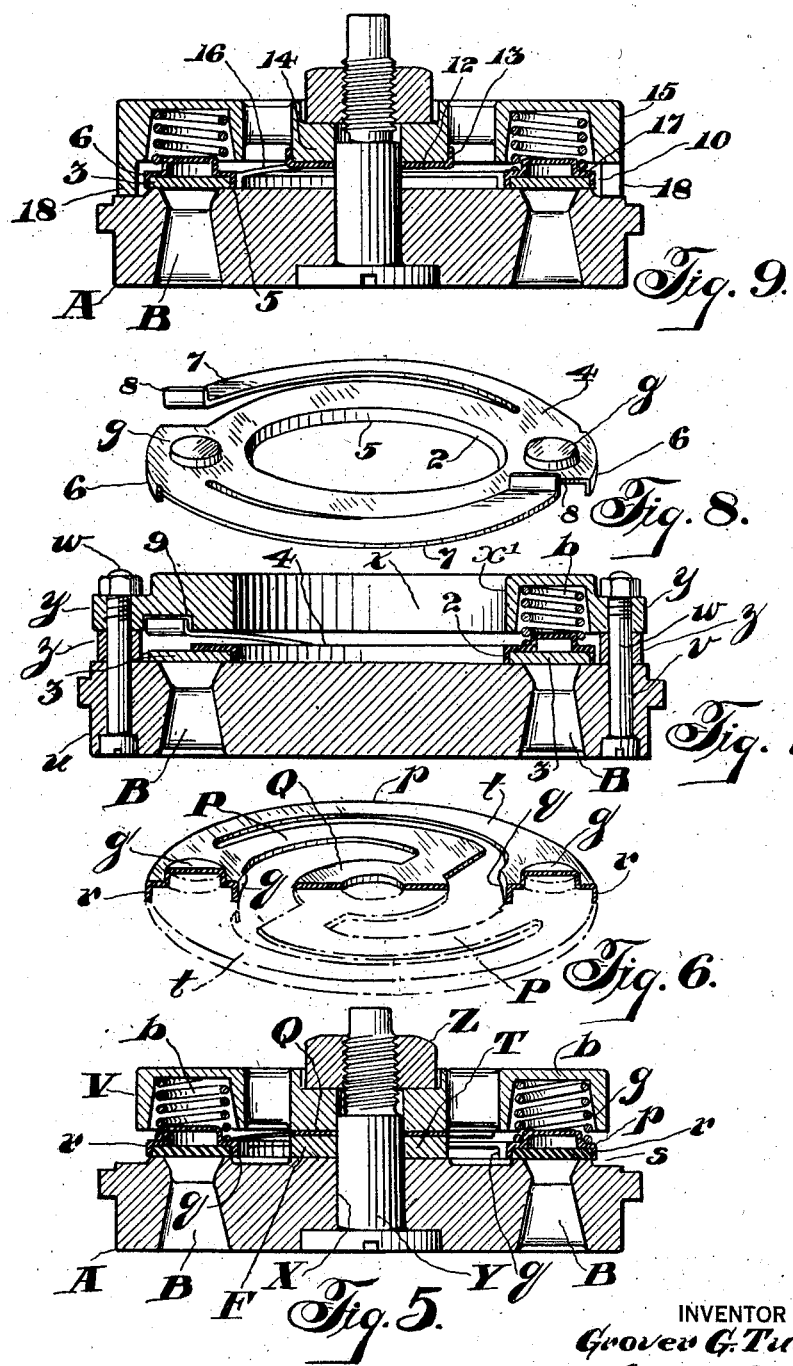

Patented Dec. 11, 1928.

1,695,069

UNITED STATES PATENT OFFICE.

GROVER G. TUTTLE, OF PHILLIPSBURG, NEW JERSEY, ASSIGNOR TO INGERSOLL-RAND COMPANY, OF JERSEY CITY, NEW JERSEY, A CORPORATION OF NEW JERSEY.

PLATE VALVE.

Application filed October 14, 1925. Serial No. 62,402.

This invention relates to plate valves, but more particularly to a plate valve of the type in which a valve plate reciprocates between the valve seat and a stop plate and is returned to its seat by suitable springs.

The objects of the invention are to eliminate friction of the valve parts during the operation of the valve, prevent breakage of the spring guide plate and guide arms, construct an efficient and simple valve having a small number of parts which may be easily and inexpensively manufactured and provide maximum port area together with a minimum lift of the valve plate.

Other objects will appear hereinafter.

The invention consists of the combinations of elements, features of construction and arrangement of parts having the general mode of operation substantially as hereinafter described and more particularly pointed out in the appended claims and illustrated in the accompanying drawings, in which Figure 1 is a transverse sectional elevation of a plate valve assembly, Figure 2 is a perspective view of the valve plate, Figure 3 is a perspective view partly in transverse section of a preferred form of spring guide plate, Figure 4 is a similar view of a modified form of spring guide plate, Figure 5 is a transverse sectional elevation of a valve assembly showing a modified form of valve construction, Figure 6 is a detail perspective view partly in transverse section of a guide plate shown in Figure 5, Figure 7 is a transverse sectional view of a modified form of plate valve construction, Figure 8 is a perspective view of a valve guide used in connection with the structure illustrated in Figure 7, and Figure 9 illustrates another modification of the invention in transverse sectional elevation.

Referring to the drawings and more particularly to the preferred modification illustrated in Figure 1, a multi-ported valve seat A is shown having ports B and a peripheral flange C which is adapted to cooperate with a seat formed in a compressor or other similar machine employing valves of this type. The valves are illustrated in the drawings as discharge valves although said valves may also be used as inlet valves if seated in inverted position. Arranged on the face D of the valve seat A is an annular flat valve plate E of thin sheet metal having a central aperture F. A plurality of arcuate ports G are formed between the aperture F and the outer edge of the valve plate E to form a solid cylindrical outer portion H and a similar inner portion J for controlling the ports B of the valve seat A.

In accordance with the present invention a separate spring guide plate K of thin sheet metal resting on the top of the valve plate E is provided with a flange L at its outer edge, said flange extending longitudinally of the guide plate to snugly engage the outer edge of the valve plate E and thus prevent any relative transverse movement between said valve plate E and said valve guide K. In this instance the spring guide plate K also has a solid cylindrical outer portion O of substantially the same width as the corresponding portion H of the valve plate E and has a pair of semi-circular flexible arms P corresponding in width and diameter with the circular portion J of the valve plate E. The arms P are preferably so formed that one end thereof is connected with a central solid annular portion or hub Q of the guide plate K and the other end of said arms is connected to the outer portion O. This may be accomplished in a simple manner by forming diagonal slots R through diametrically opposed arms S which connect the various portions of the valve guide.

To the end that the hub Q of the spring guide plate K may be properly spaced from the face D of the valve seat A, a spacing washer T is interposed between said hub and the face D. The spacing washer T is preferably of slightly greater thickness than the valve plate E so that when the parts are assembled the washer will raise the hub R and the flexible arms P slightly above the outer portion O of the guide plate K. The spacing washer T is also preferably of considerably smaller diameter than the aperture F in the valve plate E so that a space U exists therebetween for the admission or exhaust to or from the inner port B when the valve plate E is raised from its seat, depending upon whether the plate valve is being used as an inlet or a discharge valve.

Usually in plate valves of this type, means are provided for limiting the lift of the valve plate. A ported stop plate V is accordingly provided in the present instance and is held in spaced relation with respect to the valve plate E by means of a washer W interposed between said stop plate and the hub Q of the guide plate K. The valve seat A, the washers T and W, the guide plate K and the stop plate V are each provided with a hole X through which extends a bolt Y for holding said parts against relative transverse movement and a nut Z screwed on the end of the bolt Y serves to clamp the valve parts firmly in position.

In order to return the valve plate E to its seat after said plate has been lifted therefrom for the admission or discharge of air to or from the ports B, as the case may be, a plurality of springs $b$ are arranged about the cylindrical portion O and extends into apertures or recesses $c$ formed in the stop plate V whereby said springs are held against displacement. The springs $b$ may be of a light tension type since their only function is to return the valve plate E to its seat and, unlike springs frequently used in valves of this type, are not required to overcome friction of the valve parts.

The advantages of this invention reside chiefly in the fact that friction, which is usually present in plate valves of this type, has been entirely eliminated. The spring device for returning the valve to its seat may be under a light tension. Maximum flexibility is provided in the movable members of the guide plate. Adequate port area for all requirements may be obtained by means of this construction and the parts comprising the valve may be easily and cheaply manufactured and readily assembled or disassembled.

In the modification illustrated in Figure 4, the guide plate $d$ is provided with an inner flange $e$ and an outer flange $f$. In this instance buttons or seats $g$ are conveniently formed on arms $h$ to provide a seat for the springs $b$, said buttons being of suitable diameter to extend into said springs.

In order to insure adequate spring means a plurality of spring fingers $j$ of substantial length are formed near the outer flange $f$ of the guide plate $d$ and are bent to incline from their supported end so that when the valve guide is clamped in position, said spring fingers will be constantly under a light tension. If desired, the free end of the spring finger $j$ may be bent at an angle to said fingers to form hooks $k$. The hooks thus formed may cooperate with suitable slots formed in the stop plate to prevent rotative movement of the guide plate $d$ with respect to the other valve parts. The guide plate $d$ is also ported as at $o$ to provide a free path for the admission or exhaust of air to and from the valve. By providing the guide plate $d$ with the inner flange $e$ and with the outer flange $f$, separating ring valves may be employed instead of the type of valve shown in Figure 2, since by means of these flanges both valves would be properly guided against transverse movement.

In the modification shown in Figures 5 and 6, a guide plate $p$ is shown having an inner depending flange $q$ and an outer depending flange $r$ to cooperate with the inner and outer edges of a valve plate $s$. The guide plate $p$ is also provided with flexible arms P which connect the hub Q with an outer flat circular portion $t$. The flexible arms P are of sufficient length to permit free reciprocation of the valve plate $s$ together with the circular portion $t$ of the guide plate $p$. The valve plate in this instance is returned to its seat only by the coil springs $b$. The guide plate $p$ is preferably provided with the buttons or seats $g$ which serve to guide one end of the springs $b$. In this instance only a single port B is shown in the valve seat A and the valve plate $s$ is in the form of a single ring, but it is obvious that the valve guide $p$ may readily be so formed as to accommodate a series of valve plate rings, and it is to be understood that the invention is not limited to the construction shown in the drawings.

In the modification shown in Figures 7 and 8, the valve seat $u$ is provided with the ports B and has a plurality of holes $v$ near its outer edge to receive bolts $w$. In this instance a valve stop $x$ having lugs $y$ through which the bolts $w$ extend is spaced from the valve seat $u$ by means of suitable spacing washers $z$ through which the bolts $w$ extend. The valve stop $x$ has a central opening $x'$ to provide for the admission or exhaust of air therethrough. In this instance a circular valve plate 3 controls the port B and is guided by a guide plate 4. The guide plate 4 has a central aperture 2 of approximately the same area as the aperture $x'$ in the valve stop $x$ and has an inner depending flange 5 which cooperates with the inner edge of the valve plate 3. If desired, a pair of diametrically opposed outer depending flanges 6 may also be formed in the guide plate 4 to cooperate with the outer edge of the valve plate 3.

In order to augment the force of the springs $b$ so that efficient functioning of the valve plate 3 may at all times be insured, spring fingers 7 of semi-circular shape are formed on the guide plate 4 and are bent to incline toward the valve stop $x$. Hooks 8 formed on the free ends of the spring fingers 7 cooperate with suitable slots 9 in the valve stop for anchoring the guide plate and the valve plate against rotative movement with respect to the other valve parts.

Referring now to the modification shown in Figure 9, a guide plate 10 is provided with a central hub 12 having an upwardly extending flange 13 which snugly engages a cylindrical hub 14 of a stop plate 15. The valve plate 3 is preferably held against lateral movement by inner and outer depending flanges 5 and 6. Flexible arms 16 connect the circular portion 17 of the valve guide 10 with the hub 12. In this instance the flexible arms 16 are bent to incline toward the hub 14 of the stop plate 15 so that the hub 12 of the valve guide 10 will be constantly pressed against the hub 14 and the valve stop 15 has a plurality of lugs 18 which serve to hold said valve stop in proper spaced relation with respect to the valve seat A. Although the valve stop 15 is illustrated as having legs 18, it is obvious that said valve stop may also be properly spaced by means of a spacing washer as is shown in Figures 1 and 5, and if so constructed the legs 18 may be eliminated.

I claim:

1. A plate valve comprising a valve seat, a valve plate adapted to seat on said valve seat, a stop plate for limiting the opening of the valve plate, a guide plate having concentrically arranged annular solid portions, arms connecting said portions, said arms being flexible to permit relative longitudinal movement of the portions, a flange on the guide plate to engage an edge of the valve plate for guiding said valve plate, springs between the stop plate and the guide plate actuating the outer annular portions for pressing the valve plate on the valve seat, and flexible means integral with the arms engaging the stop plate for anchoring the guide plate to the stop plate.

2. A plate valve comprising a valve seat, a valve plate adapted to seat on said valve seat, a stop plate for limiting the opening of the valve plate, a guide plate having concentrically arranged annular solid portions, curved arms between said portions and integral therewith, said arms being flexible to permit relative longitudinal movement of the portions, a flange on the guide plate cooperating with an edge of the valve plate for holding the valve plate against transverse movement with respect to the guide plate, washers for holding the inner annular portion in spaced relation with respect to the stop plate and the valve seat, clamping means for holding the inner annular portion against longitudinal movement, springs between the stop plate and the outer annular portion for actuating the valve plate in one direction, spring fingers carried by the guide plate, and hooks on the spring fingers engaging the stop plate to hold the guide plate against rotary movement with respect to the stop plate.

In testimony whereof I have signed this specification.

GROVER G. TUTTLE.